United States Patent [19]

Miyamoto et al.

[11] Patent Number: 5,540,803

[45] Date of Patent: Jul. 30, 1996

[54] TIRE BUILDING SYSTEM

[75] Inventors: Yoshinori Miyamoto; Hidemasa Sato; Jiro Agawa, all of Nagasaki; Kazuo Mogi, Hiratsuka; Toru Aihara, Hiratsuka; Keizo Yamashita, Hiratsuka, all of Japan

[73] Assignee: Mitsubishi Jukogyo Kabushiki Kaisha, Tokyo, Japan

[21] Appl. No.: 394,435

[22] Filed: Feb. 24, 1995

Related U.S. Application Data

[63] Continuation of Ser. No. 94,597, Jul. 21, 1993, abandoned.

[30] Foreign Application Priority Data

Jul. 21, 1992 [JP] Japan ................................. 4-194137

[51] Int. Cl.$^6$ ................................................. B29D 30/08
[52] U.S. Cl. ................... 156/396.000; 156/111; 156/397; 156/405.1
[58] Field of Search ................................. 156/397, 396, 156/406.2, 111, 117, 126, 127, 406, 405.1

[56] References Cited

U.S. PATENT DOCUMENTS

| | | | |
|---|---|---|---|
| 3,532,577 | 10/1970 | Niclas et al. | 156/396 |
| 3,600,252 | 8/1971 | Henley et al. | 156/406 |
| 4,222,811 | 9/1980 | Enders | 156/406 |
| 4,268,330 | 5/1981 | Komatsu et al. | 156/111 |
| 4,729,521 | 3/1988 | Kubo et al. | 156/406 |
| 4,985,100 | 1/1991 | Sasaki et al. | 156/110.1 |
| 5,213,651 | 5/1993 | Fukamachi et al. | 156/396 |
| 5,215,611 | 6/1993 | Sergel et al. | 156/111 |

FOREIGN PATENT DOCUMENTS

| | | |
|---|---|---|
| 0242689 | 10/1987 | European Pat. Off. |
| 1-255528 | 10/1989 | Japan |
| 2-102032 | 4/1990 | Japan |
| 2-107432 | 4/1990 | Japan |
| 3-114737 | 5/1991 | Japan |

OTHER PUBLICATIONS

Database WPI, Section Ch, Week 9126, AN 91-188668.
Patent Abstracts of Japan, vol. 14, No. 319 (M-996), 1990.

*Primary Examiner*—Geoffrey L. Knable
*Attorney, Agent, or Firm*—Jacobson, Price, Holman & Stern, PLLC

[57] ABSTRACT

A tire building system comprises a band drum, a shaping drum, and a belt forming machine having two oscillating or rotating belt drums, in which the band drum and the shaping drum are arranged on the same axis in opposing relationship, a band transfer is disposed therebetween on the axis in such a manner as to reciprocate, the belt forming machine is arranged in parallel to the axis, and a belt transfer is disposed between the belt drum and the shaping drum in such a manner as to move in the axial direction and the direction normal to the axis.

1 Claim, 8 Drawing Sheets

FIG. 8

| POSITION A (FIG.7) | POSITION B (FIG.6) |
|---|---|
| DRUM OSCILLATION ||
| BONDING OF TREAD | WINDING OF JOINTLESS |
| UNLOADING OF BELT AND TREAD ASSEMBLY ||
| WINDING OF No.1 BELT ||
| WINDING OF No.2 BELT | WINDING OF TREAD |

FIG. 9

| POSITION A | POSITION B |
|---|---|
| DRUM OSCILLATION ||
| WINDING AND BONDING OF TREAD | WINDING OF JOINTLESS |
| UNLOADING OF BELT AND TREAD ASSEMBLY ||
| WINDING OF No.1 BELT ||
| WINDING OF No.2 BELT ||

⊗ OPERATOR POSITION

TIRE BUILDING SYSTEM

This application is a continuation of application Ser. No. 08/094,597, filed Jul. 21, 1993, now abandoned.

FIELD OF THE INVENTION AND RELATED ART STATEMENT

The present invention relates to a tire building system.

The tire building system disclosed in Japanese Patent Laid-Open No.107432/1990 comprises a band drum 1, a shaping drum 2, and a belt drum 3. These three drums are arranged in line in the opposing housings by supporting the shaping drum 2 and the belt drum 3 by the same housing 7. Between the band drum 1 and the shaping drum 2, a band transfer 4 is disposed on the same centerline as those of these drums in such a manner as to reciprocate. Between the belt drum 3 and the shaping drum 2, a belt transfer 5 is disposed on the same centerline as those of these drums in such a manner as to reciprocate.

The above-described prior art technique has the following problems.

Recently, in order to meet the increasing demand for higher rotational speed of tire, there has arisen a need for winding a member including a plurality of cords with a width of about 10 mm on the upper layer of the breaker in a spiral form, usually called jointless, coil winding, etc. This significantly increases the operation time on the belt drum 3; sometimes the operation time becomes about double the conventional time.

When a tire of such a type is to be built with the above-described tire building system, the operation time at the belt drum 3 increases even if the work is distributed to the band drum 1 and the shaping drum 2 to shorten the tire building time. Therefore, the total tire building time is approximately doubled.

On the other hand, the splicing work of sidewall wound at the band drum 1 and tread wound at the belt drum 3 is difficult to mechanize. This work must be done manually. This increases the move of the operator, resulting in the decrease in work efficiency.

OBJECT AND SUMMARY OF THE INVENTION

An object of the present invention is to provide a tire building system in which the work efficiency does not decrease even in jointless winding which requires long work time.

To solve the problems with the above-described prior art technique, the present invention provides a tire building system comprising a band drum, a shaping drum, and a belt forming machine having two oscillating or rotating belt drums, in which the band drum and the shaping drum are arranged on the same axis in opposing relationship, a band transfer is disposed therebetween on the axis in such a manner as to reciprocate, the belt forming machine is arranged in parallel to the axis, and a belt transfer is disposed between the belt drum and the shaping drum in such a manner as to move in the axial direction and the direction normal to the axis. Specifically, (1) Two belt drums 3 are arranged to distribute the work time on the belt drum increased by the winding of jointless, etc. However, the two drums must be oscillated or rotated in order to repeat the operations of successive winding of materials such as No.1 belt, No.2 belt, jointless, and tread, and unloading by means of the belt transfer 5. Therefore, it is impossible to mount the shaping drum 2 and the belt drum 3 in the same housing as shown in FIG. 10. For this reason, an independent housing 13 is mounted separately from the housing 7 as shown in FIG. 1.

(2) The band drum 1 on which sidewall is wound and the belt drums 11a and 11b on which tread is wound are arranged at opposing, close positions in such a manner that the operator stands between them.

With the tire building system of the present invention, tread and jointless are wound on one of the two belt drums and No.1 belt and No.2 belt are wound on the other.

Then, the positions of the two belt drums are turned over to perform the winding operations. Therefore, belt can be wound on one drum while jointless is wound on the other, thereby the winding operation time being shortened.

The tire building system of the present invention comprises a band drum, a shaping drum, and a belt forming machine having two oscillating or rotating belt drums, in which the band drum and the shaping drum are arranged on the same axis in opposing relationship, a band transfer is disposed therebetween on the axis in such a manner as to reciprocate, the belt forming machine is arranged in parallel to the axis, and a belt transfer is disposed between the belt drum and the shaping drum in such a manner as to move in the axial direction and the direction normal to the axis. Therefore, this system has the following effects:

(1) A high-performance tire, in which a reinforcing strip is wound on the belt layer called jointless, coil winding, etc. can be built without increasing the total cycle time.

(2) The drums requiring manual work or monitoring performed by the operator lie near the operator position. This decreases the move of the operator and reduces the work load.

(3) Although the belt transfer must move in a wide range between the belt drum and the shaping drum by means of an overhead traveling device, its range does not intersect the area in which the operator does his/her work.

BRIEF DESCRIPTION OF THE DRAWINGS

In the drawings,

FIG. 8 is one operation chart for a belt forming machine, FIG. 9 is another operation chart for a belt forming machine.

DETAILED DESCRIPTION OF PREFERRED EMBODIMENTS

Figure 1:
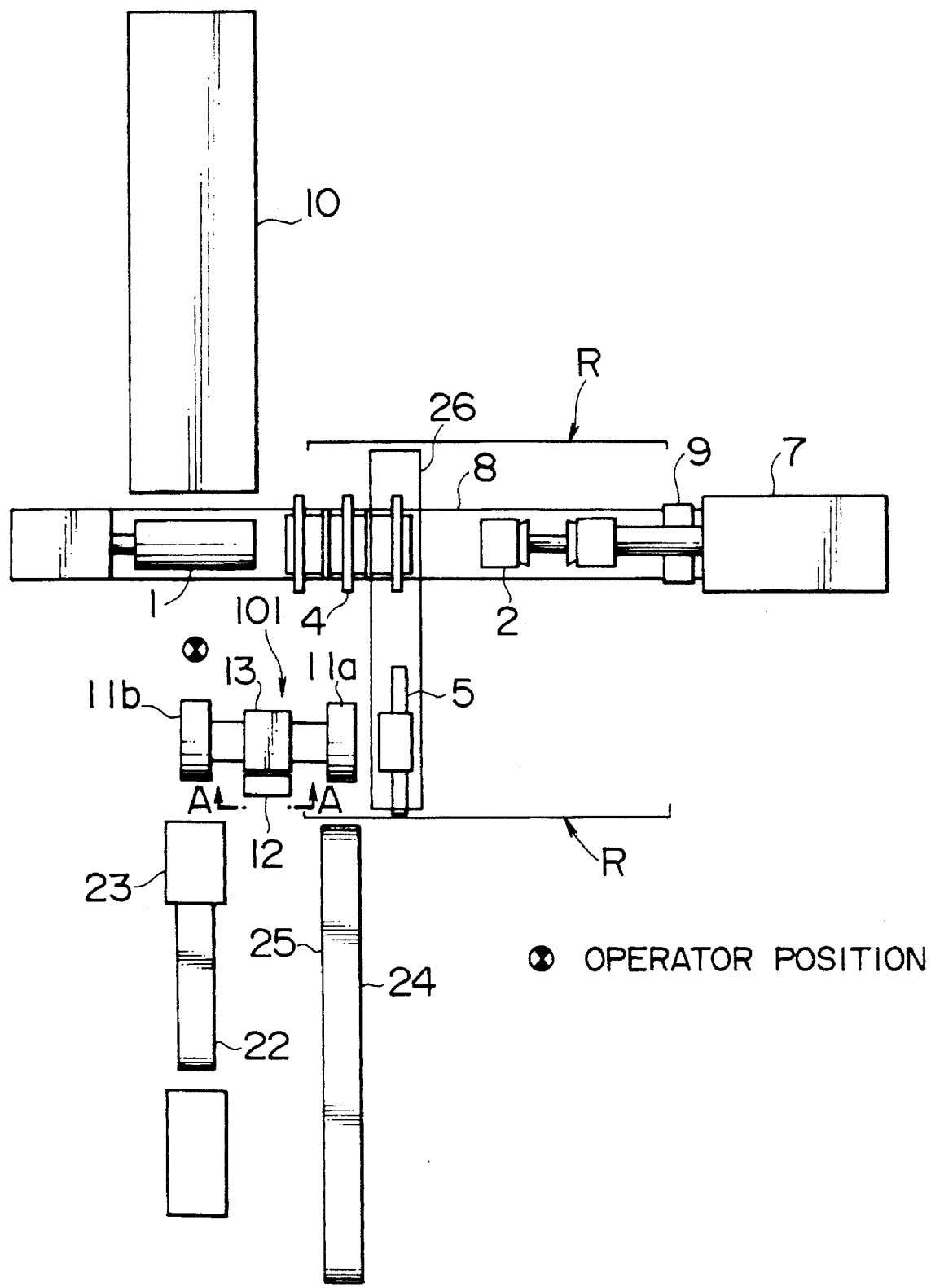
FIG. 1 is a general arrangement view showing the embodiment of the present invention.

An embodiment of the present invention will be described with reference to FIGS. 1 through 9.

The band drum 1 and the shaping drum 2 are arranged on the same axis in opposing relationship. Reference numeral 8 denotes a common center base for the drums. A band transfer 4 for carrying a band assembled at the band drum 1 to the shaping drum 2 and a stitch-unloader 9 which stitches a tread just under the shaping drum 2 and unloads a finished green tire are disposed on the center base 8 in such a manner as to reciprocate.

The band transfer 4 may be similar to that described in the specification of Japanese Patent Laid-Open No.255528/1989, and the stitch-unloader 9 may be similar to that described in the specification of Japanese Patent Laid-Open No.102032/1990. A servicer 10 for supplying materials is disposed at the rear of the band drum 1. The servicer 10 may be of a publicly known type.

The band transfer described in the specification of Japanese Patent Laid-Open No.255528/1989 includes a band holding device and a bead holding device. The band holding device holds a band formed by an inner liner which is assembled in the first-stage building device, and a carcass spline. The band transfer also holds an expanded band wound on the band drum by sucking using many vacuum pads. The bead holding device holds a bead with filler on a bead loader and positions it with respect to the band.

With the band transfer of this type, the band and bead are carried to the shaping drum section after they are positioned accurately. At this time, the expanded band wound on the band drum is held by sucking using many vacuum pads, and the bead holding device accurately grips the bead with filler on the bead loader and positions it with respect to the band. The bead with filler held by the bead holding device is accurately clamped by a bead lock on the shaping drum, and the band sucked around the shaping drum is removed by the stop of suction of the vacuum pads.

The stitch-unloader described in the specification of Japanese Patent Laid-Open No.102032/1990 has three types of stitch wheels to stitch the center portion, the outside portion of the center, and the shoulder portion. This stitch-unloader has brakes on at least two of the three wheels and has an additional wheel at the position where stitch is performed. The stitch unloader itself has a function of holding a tire, and can travel in the axial direction of the tire building machine so that the tire can be unloaded.

Near the band drum 1 and the operator, a belt forming machine 101 is disposed in parallel to the band drum 1 with a space.

Two belt drums 11a and 11b of the belt forming machine are mounted in a housing 13 which is rotatably supported by a stand 12 by a horizontally-extending axis to rotate the two belt drums through a vertical plane about the horizontally-extending axis, with the horizontally-extending axis being perpendicular to an axis through the band and shaping drums and with the housing located between the stand and the axis of the band and shaping drums.

Figure 2:
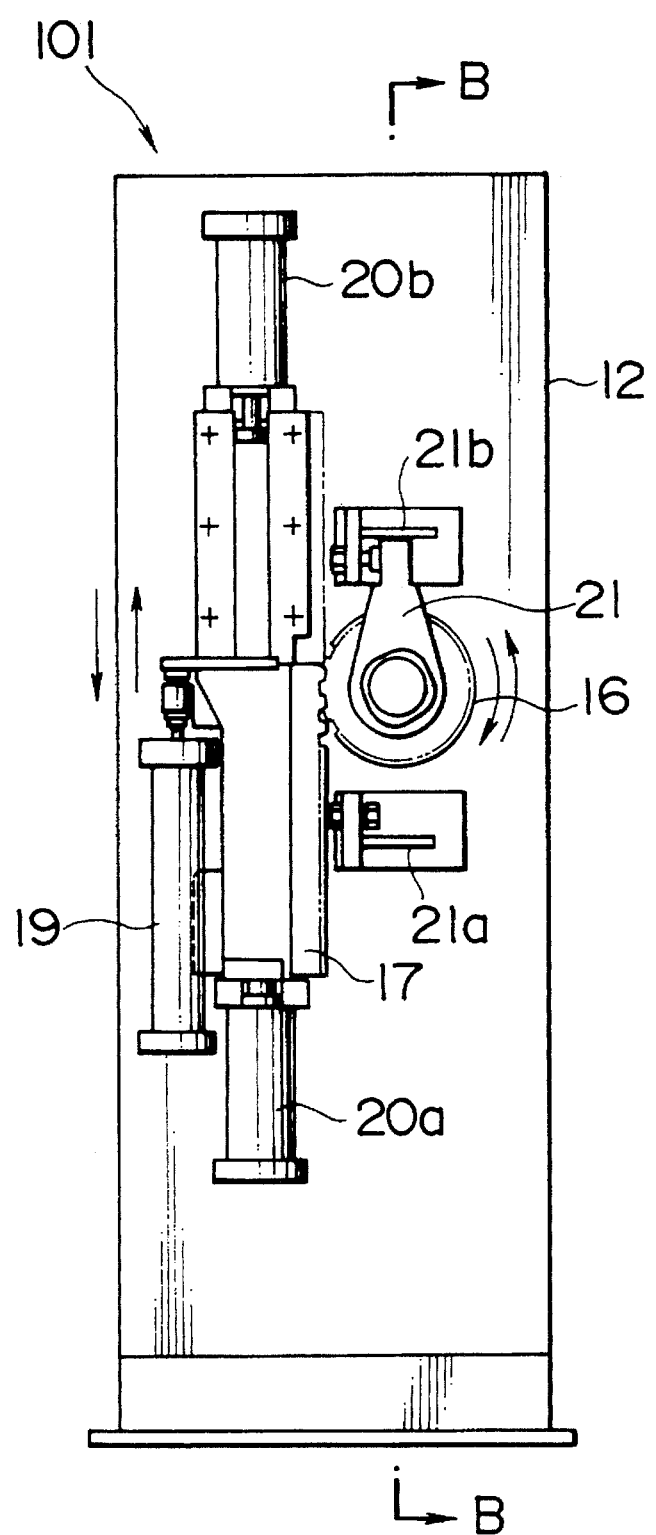
FIG. 2 is a sectional view taken along the line A—A of FIG. 1.
Figure 3:
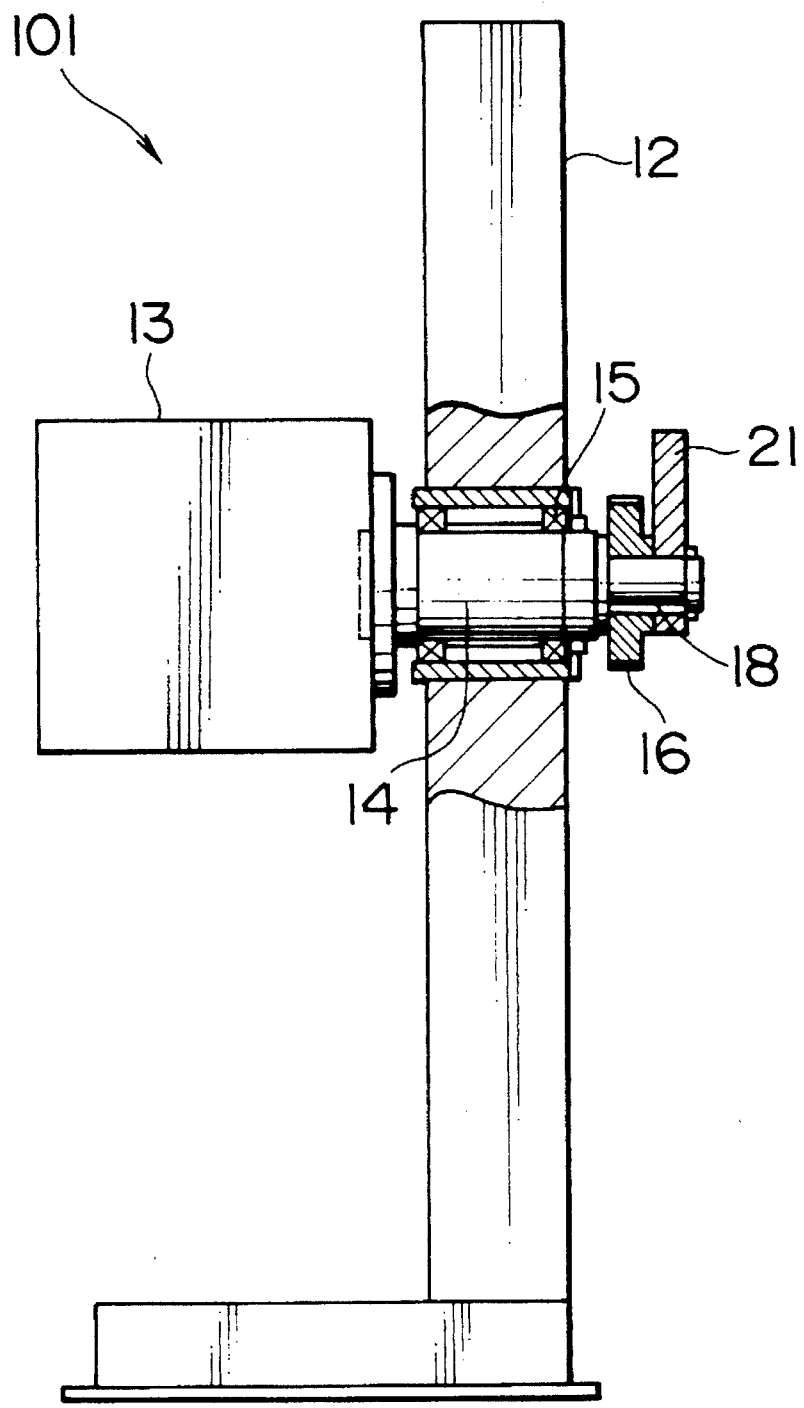
FIG. 3 is a sectional view taken along the line B—B of FIG. 2.
Figure 4:
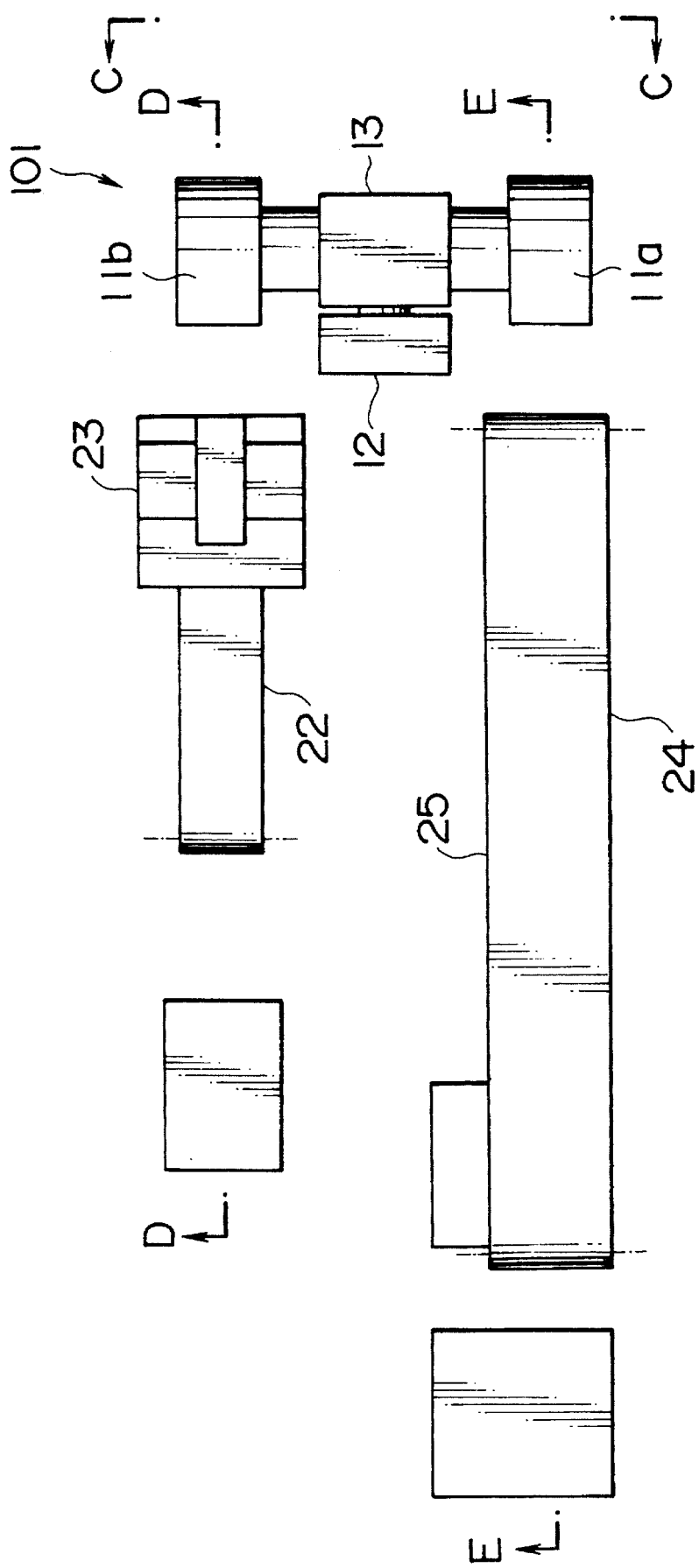
FIG. 4 is an arrangement view of servicers relating to a belt forming machine.
Figure 5:
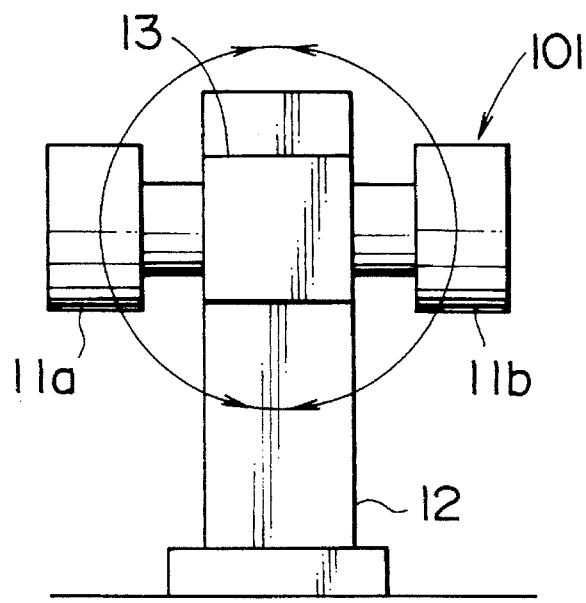
FIG. 5 is a sectional view taken along the line C—C of FIG. 4.
Figure 6:
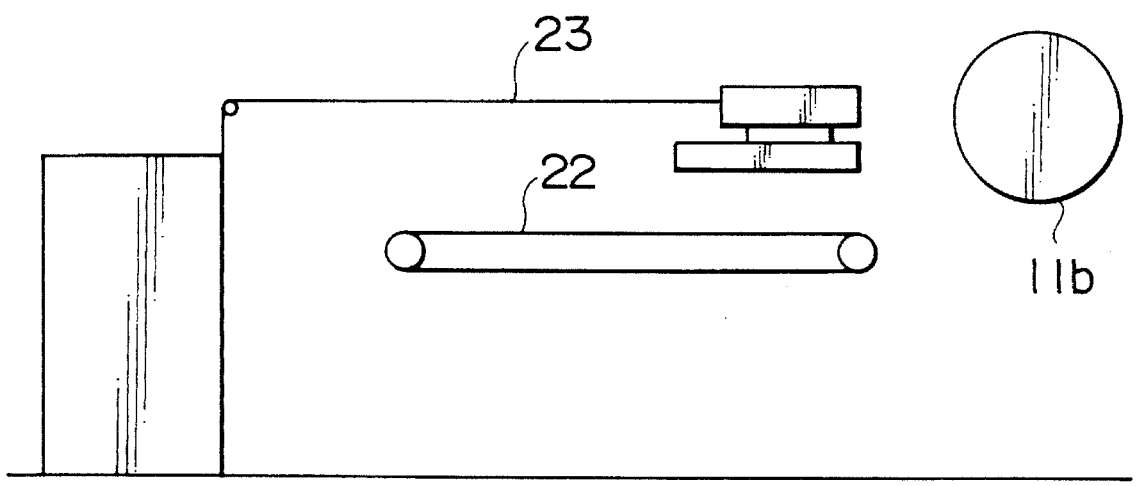
FIG. 6 is a sectional view taken along the line D—D of FIG. 4.

The oscillating mechanism of the belt forming machine is shown in FIGS. 2 and 3. A shaft 14 is installed at one end of the housing 13. The shaft 14 is rotatably supported by a stand 12 via a bearing 15. A pinion 16 is fixed to the end of the shaft 14 via a key 18 while engaging with a rack 17.

The rack 17 is reciprocated vertically by means of an air cylinder 19, by which the housing 13 oscillates via a pinion 16, and in turn the belt drums 11a and 11b oscillates 180 degrees. At each oscillating position, shock is absorbed by shock absorbers 20a and 20b via the rack 17, and the adjustment of accurate position is made by stoppers 21a and 21b via a member 21.

Various servicers 22, 23, 24, and 25 are arranged at the rear of the belt forming machine 101. FIGS. 4 through 7 shows their arrangement. At the lower stage at the rear of the belt drum 11b, a tread servicer 22 is disposed, while at the upper stage, a jointless servicer 23 is disposed. At the upper and lower stages at the rear of the belt drum 11a, No.1 belt servicer 24 and No.2 belt servicer 25 are disposed, respectively. Each servicer used in this system is publicly known; therefore, the description of its detail is omitted.

In the range R covering the belt drum 11a and the shaping drum 2, an overhead traveling device 26 is installed. Over the device 26, a belt transfer 5 is mounted in such a manner as to move between the belt drum 11a and the shaping drum 2.

Next, the operation of the tire building system in accordance with the present invention will be described.

(1) Preparation of Bead and Band

This operation is similar to that described in the specification of Japanese Patent Laid-Open No.107432/1990.

That is, on the band drum 1, a band is formed by sticking the sidewall, the inner liner, and carcass. Then, the band transfer 4 holding a bead runs to hold the band on the band drum 1.

(2) Preparation of Belt and Tread Assembly

Figure 7:
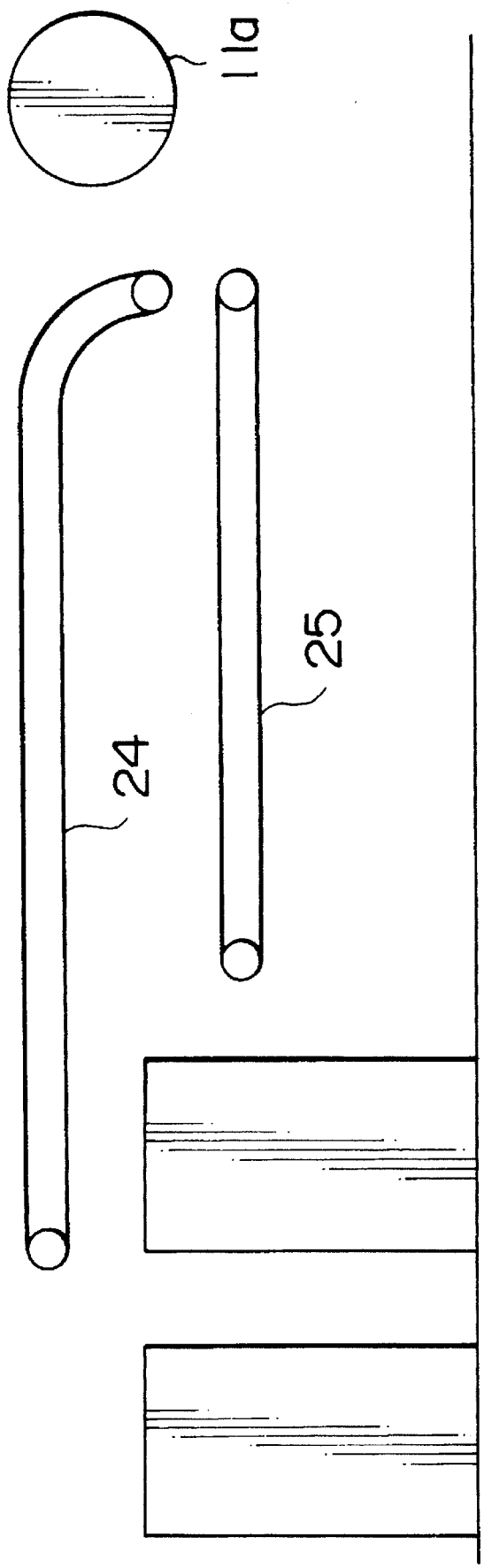
FIG. 7 is a sectional view taken along the line E—E of FIG. 4.
Figure 10:
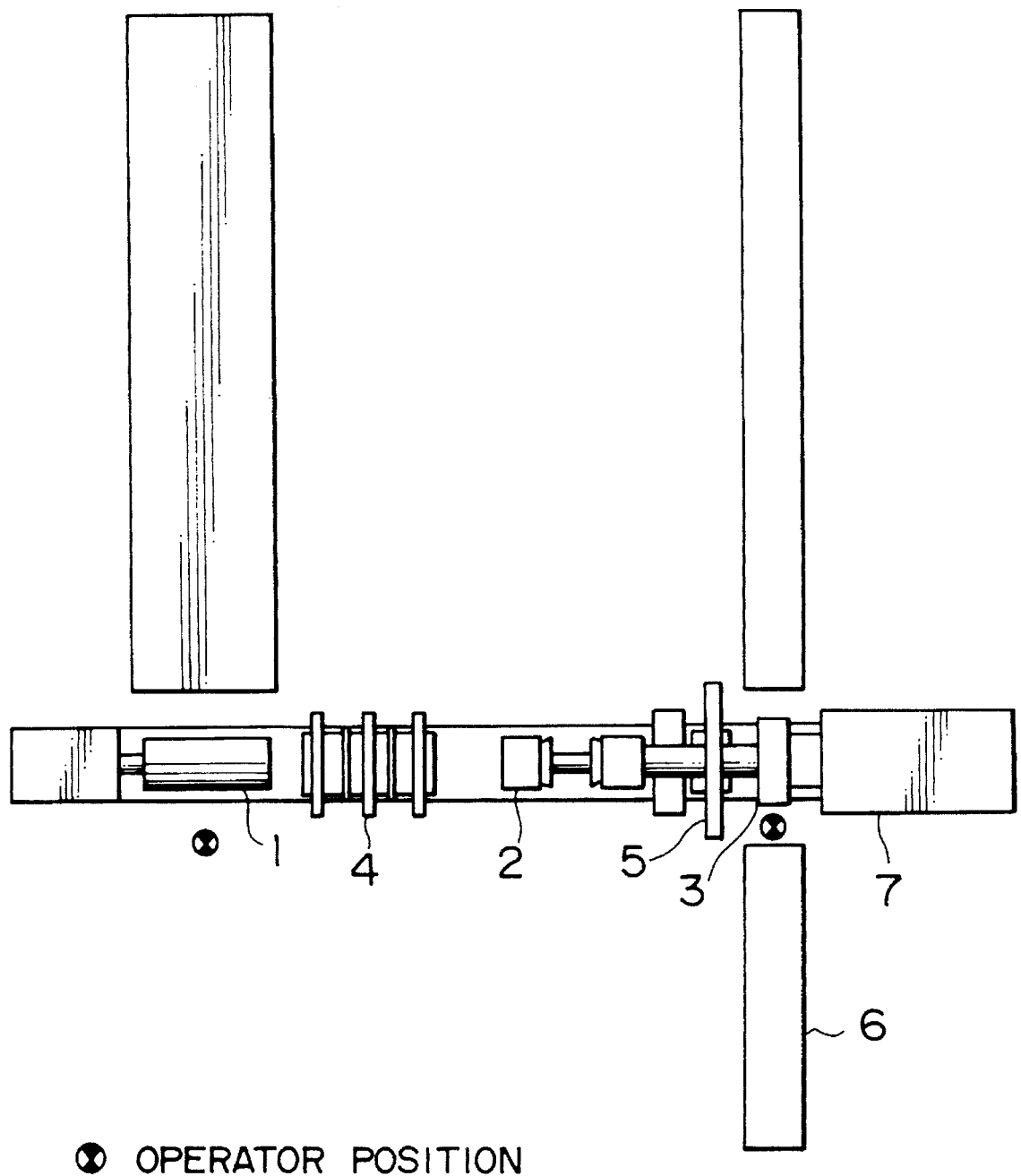
FIG. 10 is a general arrangement view of a conventional tire building system.

After the belt and tread assembly fabricated by the operation shown in FIG. 7 is removed from the belt drum, No.1 belt is wound on the drum 11a by means of No.1 belt servicer 24, and No.2 belt is wound by means of No.2 belt servicer 25. Then, the belt drums 11a and 11b are rotated 180 degrees in a vertical plane, and thereafter the jointless is wound by means of the jointless servicer 23, and the tread is wound by means of the tread servicer 22 (see FIGS. 6 and 7). Then, the belt drums 11a and 11b are rotated 180 degrees, and the belt and tread assembly is removed from the belt drum 11a. Afterward, the above operation is repeated at each position.

The chart of these operations is shown in FIG. 8. In the chart, Position A indicates the operations in FIG. 7, while Position B in FIG. 6. This operation chart depends on the arrangement of servicers determined from the material supply condition at the factory, the distribution of winding time for each material, and particularly on the length of the winding time of jointless. FIG. 9 shows a typical operation chart for the case where the winding of jointless requires long time.

(3) From Band Insertion to Tire Unloading (3.1) For Tread Over Sidewall Construction The bead and band are carried to the shaping drum 2 using the band transfer 4. The band transfer 4 goes back during the time when bead lock and turnup are performed on the shaping drum 2, while the traveling device moves so that the belt transfer 5 carries the belt and tread assembly removed from the belt drum 11a to the shaping drum 2. Succeedingly, the stitch-unloader 9 stitches the tread and unloads the finished green tire.

(3.2) For Sidewall Over Tread Construction

For this construction, the belt and tread assembly is transferred and loaded immediately after the bead is locked to the band. Therefore, the belt transfer 5 initially waits at the housing side beyond the shaping drum 2. At the same time, the band transfer 4 carries the bead and band to the shaping drum 2. Then, the bead lock and shaping are performed. After the belt and tread assembly is loaded, stitching and turnup are performed by the stitch-unloader 9. Finally, the finished green tire is unloaded by the stitch-unloader 9.

(4) Movement of Building Operator

The building operator repeatedly performs the splicing work for sidewall at the band drum 1 and the splicing work for tread at the belt drum 11a. He/she makes a check for belt splice as necessary.

We claim:

1. A tire building system comprising a band drum, a shaping drum, a belt forming machine having two belt drums, a housing, and a stand, said two belt drums being mounted on said housing, said housing being rotatably mounted on said stand for transfer of position of said two drums upon rotation of said housing in a vertical plane about a horizontally extending axis, said band drum and said shaping drum being rotatable about and arranged on opposite ends of a first longitudinal axis, a band transfer reciprocatingly mounted between said band drum and said shaping drum and extending on said first longitudinal axis, said two belt drums of said belt forming machine each having an axis of rotation located on a second longitudinal axis extending parallel to and offset from said first longitudinal axis, said belt forming machine being positioned on one side of and spaced from said band drum so that an operator may stand between said belt forming machine and said band drum, a belt transfer disposed at one end adjacent to one of said two belt drums and extending, at the other end, between said band drum and said shaping drum and said belt transfer being movable between and in a direction transverse to said first longitudinal axis and said second longitudinal axis, each of said two belt drums having two servicers for supplying materials with one servicer located above the other servicer in each set of two servicers, one set of servicers supplying tread and jointless materials to one of said two belt drums, and the other set of servicers supplying first and second belts to the other of said two belt drums, said two servicers for each of said two belt drums being located on an opposite side of said belt forming machine from said band drum, and said band drum including a servicer for supplying materials located on an opposite side of said band drum from said belt forming machine.

* * * * *